United States Patent [19]

Cole

[11] Patent Number: 4,469,297
[45] Date of Patent: Sep. 4, 1984

[54] EXTENDIBLE AIRFOIL CABLE DRUM TRACK ASSEMBLY

[75] Inventor: James B. Cole, Mercer Island, Wash.

[73] Assignee: The Boeing Company, Seattle, Wash.

[21] Appl. No.: 429,873

[22] Filed: Sep. 30, 1982

Related U.S. Application Data

[63] Continuation-in-part of Ser. No. 177,674, Aug. 13, 1980, abandoned.

[51] Int. Cl.³ .............................................. B64C 9/24
[52] U.S. Cl. ................................................... 244/215
[58] Field of Search .............. 244/213, 214, 215, 216, 244/218, 219; 254/95, 97; 74/89.2, 89.22

[56] References Cited

U.S. PATENT DOCUMENTS

| | | | |
|---|---|---|---|
| 1,917,428 | 7/1933 | Burnelli | 244/215 |
| 2,235,146 | 3/1941 | Fowler | 244/216 |
| 2,298,264 | 10/1942 | Czurles et al. | 244/214 |
| 2,702,676 | 2/1955 | Delaney, Jr. | 244/214 |
| 2,938,680 | 5/1960 | Greene et al. | 244/214 |
| 3,087,343 | 4/1963 | Wubbe | 74/89.22 |
| 3,089,666 | 5/1963 | Quenzler | 244/214 |
| 4,286,649 | 9/1981 | Rokop et al. | 254/97 |

FOREIGN PATENT DOCUMENTS 724312  7/1942  Fed. Rep. of Germany ...... 244/214

Primary Examiner—Galen L. Barefoot
Attorney, Agent, or Firm—H. Gus Hartmann; B. A. Donahue

[57] ABSTRACT

An actuation and extension mechanism for aerodynamic high-lift devices such as a wing leading edge slat or a wing trailing edge flap; wherein an aerodynamic panel is connected to one end of an extendible track member that is supported and guided by its other end through rollers fixedly mounted to wing rib structure. The track member incorporates a cable and drum arrangement as part of the extension or retraction mechanism; and this combination of track, cable and drum provides the primary support and drive means for the high-lift device without compromising the structural strength or the stress safety of said combination.

3 Claims, 8 Drawing Figures

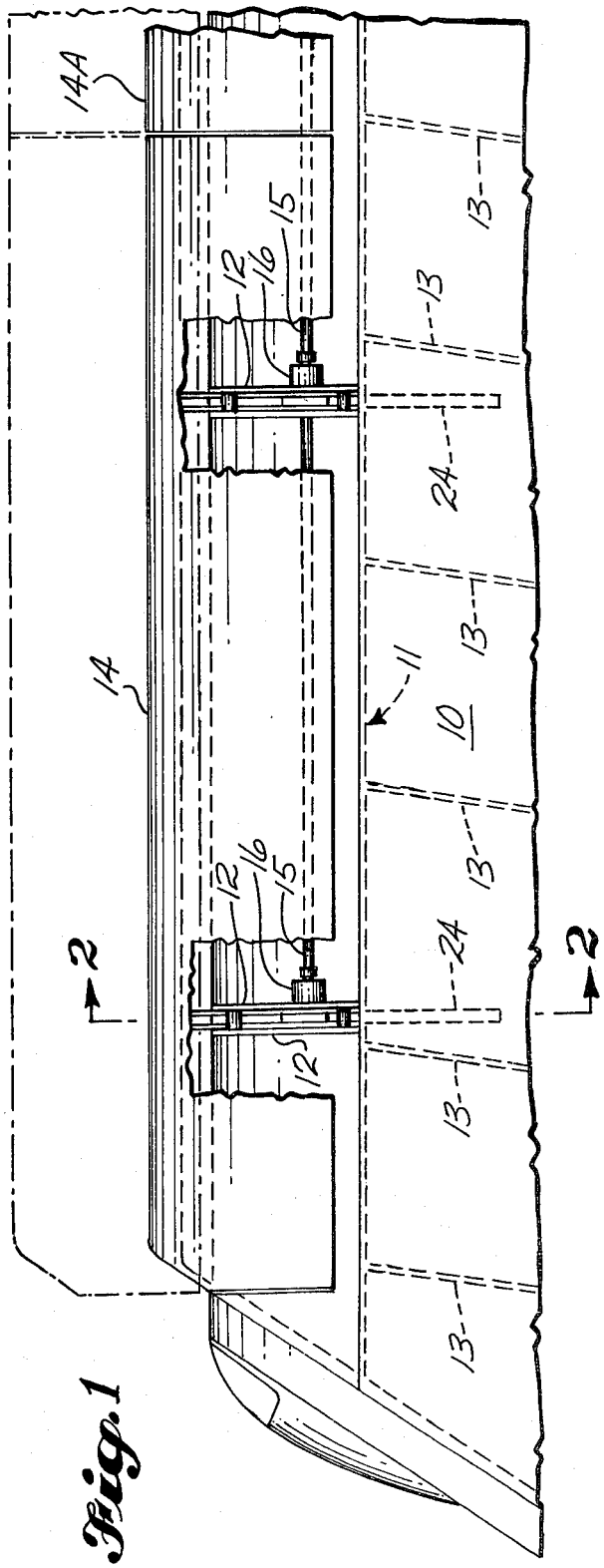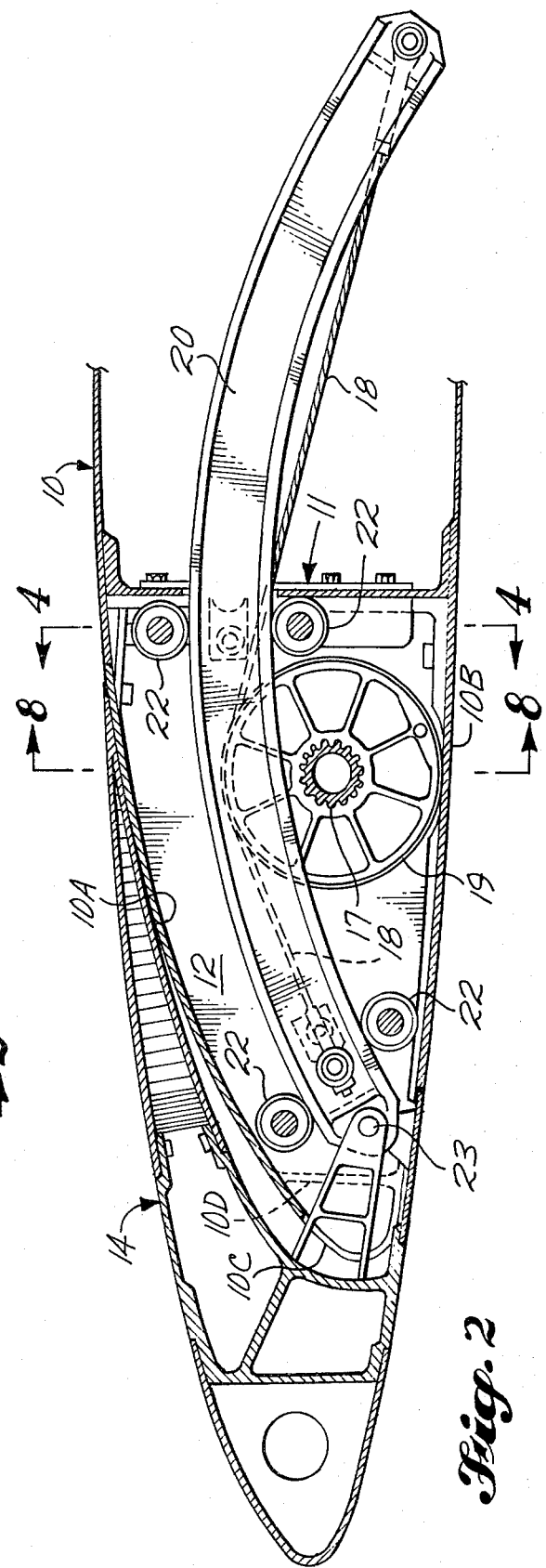

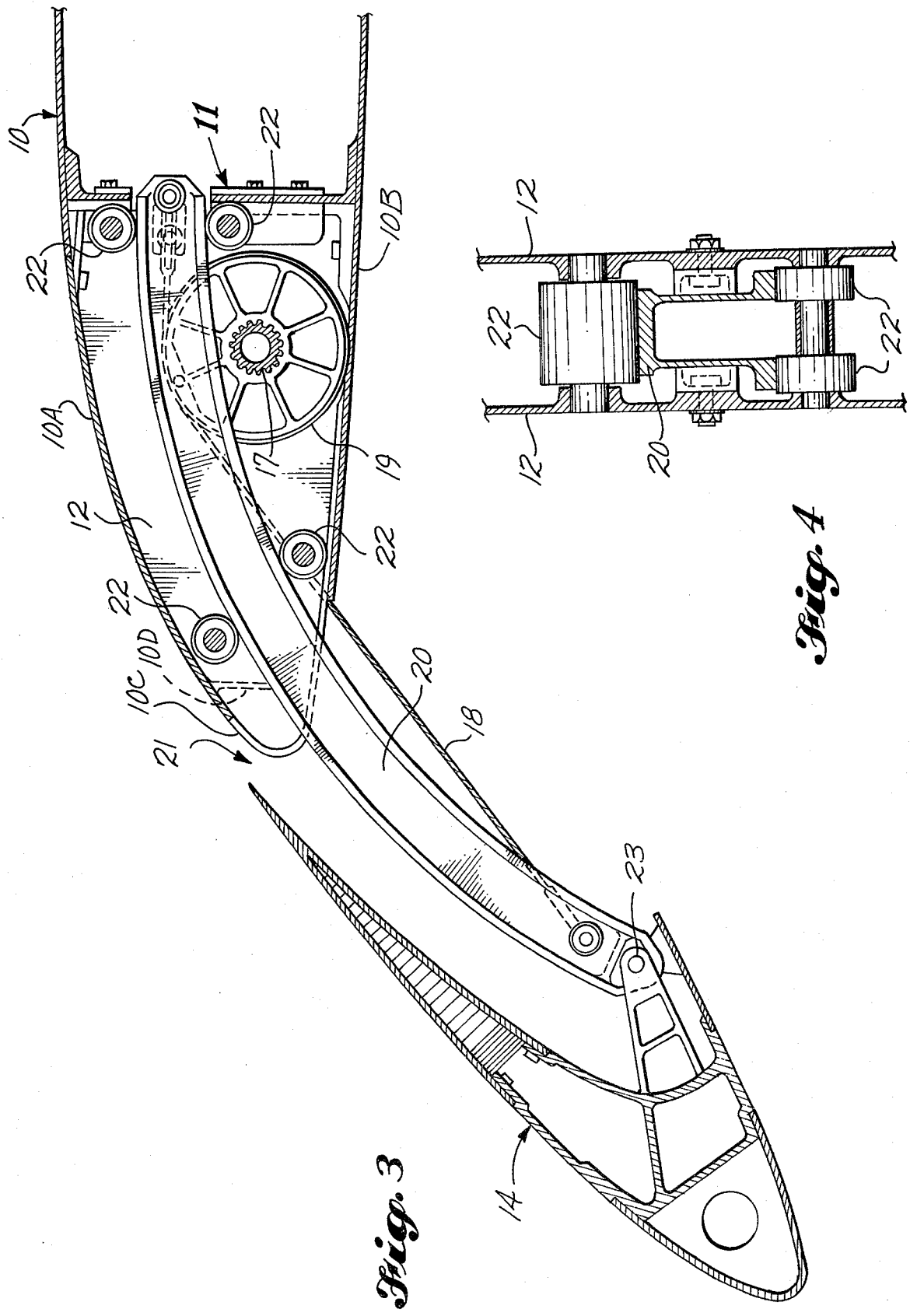

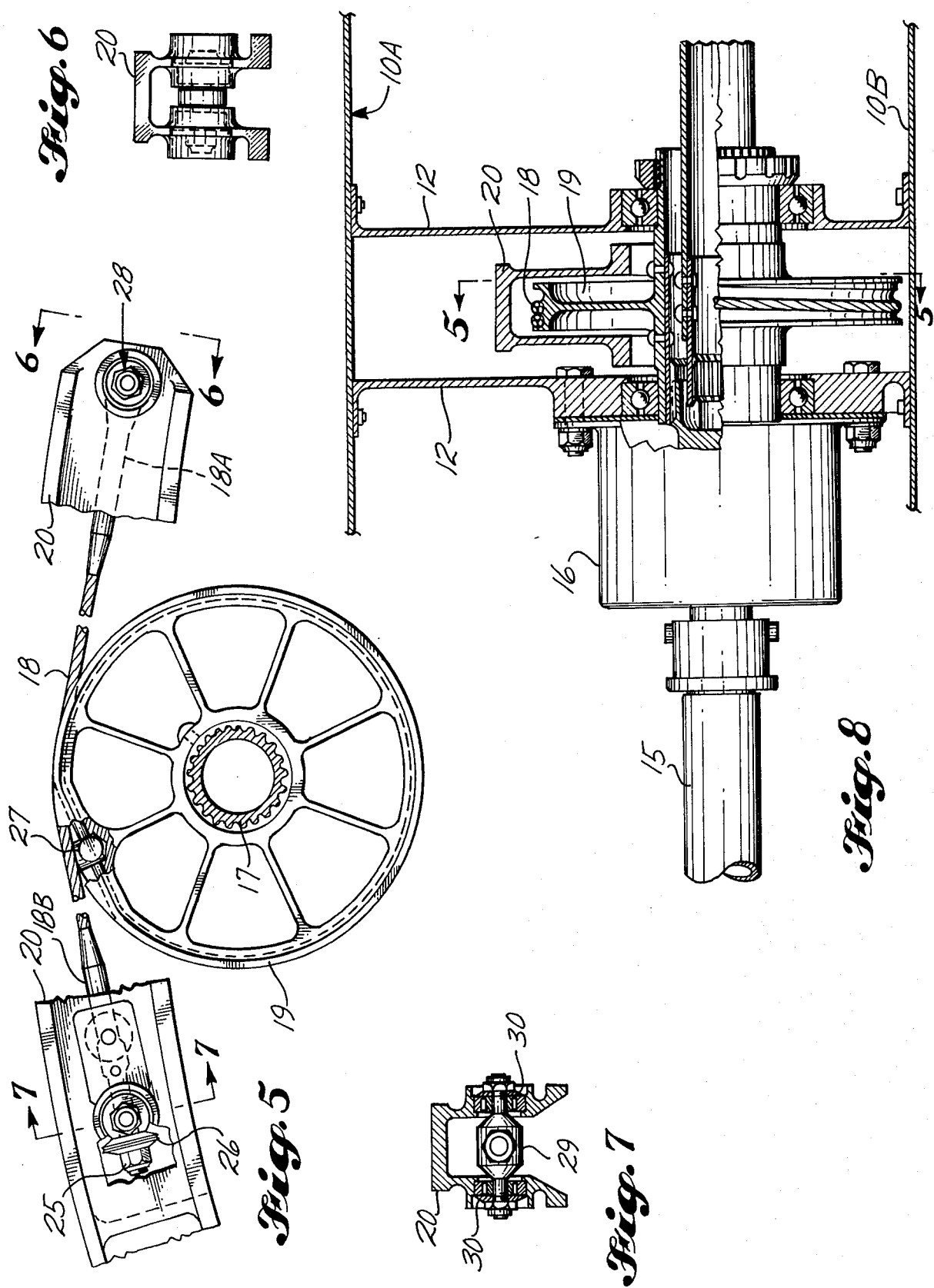

EXTENDIBLE AIRFOIL CABLE DRUM TRACK ASSEMBLY

SUMMARY OF THE INVENTION

This application is a continuation-in-part of Application Ser. No. 177,674, filed Aug. 13, 1980, assigned to The Boeing Company and now abandoned.

The invention relates to aerodynamic high-lift devices which are extended, by an actuation mechanism, to operating positions relative to a fixed airfoil section for improving low-speed aerodynamic performance of an airplane during landing or take off mode of operation; and more particularly to a main support or carrier track which separately incorporates a cable and drum arrangement, and this combination provides for support and actuation of the aerodynamic device relative to the fixed airfoil section.

In the generally known actuation system for wing leading edge slats or trailing edge flaps the following type of units are generally spaced apart spanwise along the length of a slat or flap panel: a pair of carrier tracks, rails or main support tracks; a pair of driving ball-screw jacks or linear actuators and a pair of positioning or programming tracks. Another known actuation system has a slat support or carrier track with gear teeth cut into the lower surface for meshing with a pinion drive gear; however, because the carrier track is the main support for the aerodynamic loads imposed on the operatively extended slat, any cutouts in the lower surface of the carrier track, such as for gear teeth, would set up a notch-stress condition that would compromise the structural strength and stress safety, which would be unacceptable for commercial passenger carrying airplanes.

Therefore, an advantage of combining the separate elements of a carrier track with a cable and drum drive means, as taught by the present invention permits each element to be isolated from the other so that stress fatigue cracks or other failure of said drive means will not affect the structural strength of the main support carrier track.

An object of the invention is to position the cable and portion of the cable drum up inside an inverted U-shaped channel of the carrier track cross section to protect the cable and cable drum winding from accumulating dirt, ice and other foreign material.

An advantage of positioning the cable and a portion of the cable drum up inside the channel of the carrier track is that it allows the cable drum to be positioned up higher into the wing cavity and reduces the possibility of its protruding or bulging from the lower surface of the wing.

Another advantage is that the installation of the combination of a slat carrier track with a cable drum drive means requires a minimum number of cutouts through the fixed wing leading edge; whereas, with known actuating systems incorporating linear actuators, an additional pair of cutouts are required per slat panel.

BRIEF DESCRIPTION OF THE DRAWINGS

FIG. 1 is a plan view of a wing tip leading edge section with a spanwise series of slat panels.

FIG. 2 is a chordwise cross-sectional view taken along the line 2—2 of FIG. 1 in the direction indicated and depicts a wing leading edge slat at its fully retracted position whereat it completes the leading edge profile of the wing airfoil section; and this slat position is generally for the cruise flight mode of airplane operation.

FIG. 3 is a view similar to FIG. 2 with the leading edge slat at a forward extended operating position whereat an aerodynamic slot is formed between the leading edge of the fixed wing structure and the trailing edge of the extened slat panel; and this slat position is generally used for the landing or take off mode of airplane operation.

FIG. 4 is an enlarged sectional view taken along the line 4—4 of FIG. 2 in the direction indicated.

FIG. 5 is an enlarged side view of the cable and drum arrangement and its attachment to the slat carrier track.

FIG. 6 is a sectional view taken along the line 6—6 of FIG. 5 in the direction indicated.

FIG. 7 is a sectional view taken along the line 7—7 of FIG. 5 in the direction indicated.

FIG. 8 is an enlarged sectional view taken along the line 8—8 of FIG. 2 in the direction indicated.

DESCRIPTION OF THE PREFERRED EMBODIMENT

FIG. 1 is a plan view of an outboard, leading edge section of an airplane wing portion 10 having a front wing spar 11, leading edge ribs 12, main rib members 13 and a spanwise series of slat panels 14 along the wing leading edge. For extending or retracting the slat panels 14 relative to a fixed wing leading edge, a power drive system is mounted spanwise along the front wing spar 11 and comprises: a power drive unit (not shown) such as a hydraulic or electric drive motor for rotating a spanwise series of axially aligned shafts or torque tubes 15, at a relatively high speed. The high speed shafts 15 operate the extension or retraction mechanicm of the slat panels 14 through a speed reducer and torque converter unit 16, hereinafter referred to as rotary actuator 16. Each of the rotary actuators 16 is shown mounted adjacent to a pair of wing leading edge ribs 12 which straddle a cable 18 wound on a cable drum 19. The cable drum 19 is mounted on a splined collar 17 which is the output drive of the rotary actuator 16. The high speed shafts 15 operate through the rotary actuators 16 and function to controllably tie one slat panel 14 to its adjacent slat panel 14A, without any additional slat drive synchronization mechanism being required.

FIG. 2 is a chordwise cross-sectional view taken in the direction indicated by the line 2—2 of FIG. 1 and shows a wing leading edge slat 14 at a fully retracted position whereat it completes the leading edge aerodynamic profile of the wing airfoil section for the cruise flight mode of airplane operation. Due to limited cross-sectional thickness of the airfoil at the location of the spanwise outboard slat panel 14, there is a limited stowage volume for a slat actuating mechanism. However, a preferred embodiment of the present invention, which relates to the combination of a slat carrier track 20 and a cable 18 wound around a cable drum 19, is capable of being housed completely within the leading edge airfoil section envelope of the wing; and this combination is geometrically arranged to produce a relatively large amount of slat panel extension or retraction travel.

FIG. 3 is a chordwise cross-sectional view similar to FIG. 2 with the slat panel 14 extended, by the preferred embodiment of a track extension mechanism, to a forward operating position; whereat, an aerodynamic slot 21 is formed between the leading edge of the fixed wing structure and the trailing edge of the extended slat panel 14; and this slat position is generally used for the landing mode of airplane operation.

The fixed leading edge section of the wing comprises: an upper surface skin panel 10A; a lower surface skin panel 10B; upper and lower skin panels 10A and 10B are attached to a rigid leading edge nose structure 10C having a spanwise nose beam 10D; and this entire structure is supported by chordwise, leading edge wing ribs 12 which are fixedly attached to a spanwise structural member such as the front wing spar 11.

Each individual slat panel 14 is supported in the extended operating position shown in FIG. 3 by the curved carrier track 20 which is mounted on rollers 22 having their rotational axis fixed to the wing rib 12. These curved carrier tracks 20 are the main support members for the slat panels 14.

The forward end of these carrier tracks 20 is pivotally connected at 23 to the slat panels 14; and the arcuate extension or retraction motion of the main carrier tracks 20 is about a theoretical center-of-rotation (not shown). There are two spanwise spaced main carrier tracks 20 for support of each individual slat panel 14; and the tracks 20 need not be located as shown in FIG. 1, but they could be located at the ends of the slat panel 14. When the slat panel 14 is in the fully retracted position, the main carrier tracks 20 protrude aft through a small opening in the front wing spar 11 and this protrusion of the track has a fluid-tight enclosure 24, shown in FIG. 1, because the interior of the wing is usually a fuel bay area.

Each individual slat panel 14 is supported in the extended position shown in FIG. 3 by the curved track 20 having the internally mounted cable 18 which is wound around the cable drum 19 as shown in the enlarged detail views of FIGS. 5 to 7.

Referring to FIGS. 1, 4 and 8, which are sectional views taken along the lines 4—4 and 8—8, respectively, of FIG. 2, the cable drum 19, track 20 and rollers 22 are centered spanwise between a pair of wing ribs 12 which provide a structurally straddled support. The axially aligned series of high speed shafts 15 rotate within the approximate range of 600 to 1,000 r.p.m. and go into and through actuators 16 which comprise a planetary gear mechanism of about 200:1 reduction ratio and which rotates an output collar 17 at a relatively slow rate of speed. The actuator output collar 17 is splined to cable drum 19 which, through cable 18, extended or retracts the slat panel 14. The spanwise series of high speed shafts 15 function to coordinate the extension and retraction sequence of the spanwise series of slat panels 14.

One of the problems of getting maximum extension travel of a slat panel, from the fixed leading edge portion of a wing, is that as the cross-sectional thickness of a wing airfoil section decreases, it becomes more and more difficult to design a simple slat actuating mechanism that will operatively: extend a slat panel to the distance shown in FIG. 3; function satisfactorily throughout the complete extension and retraction cycle; and still be capable of stowing within the wing cavity area as shown in FIG. 2. It is conceivable that a ball-screw jack or linear actuator, with one end pivotally connected to the slat panel and the other end connected to the front wing spar, as in generally known slat extension systems, could be used to produce a maximum slat extension similar to the present invention; however, it will also be evident that a substantial cutout will have to be made in the undersurface of the fixed leading edge portion of the wing for clearance of said actuators and that these cutouts will have to be in addition to those made for the set of slat carrier tracks and the set of programming tracks or mechanism, because a typical extension system for a single slat panel generally requires: a set of carrier tracks; a set of programming members; and a set of actuation members such as ballscrews or linear actuators. Also, for each of these slat extension sets, it is generally necessary to provide a pair of wing ribs for structural support. Further, the cutouts in the fixed leading edge cause an irregularity in the air flow from an aerodynamic standpoint because they disrupt the airflow through the aerodynamic slot shown in FIG. 3.

Referring to FIGS. 2 to 5, it will be noted that the cable 18 is located up inside the inverted U-shaped channel or slot of the slat support track 20 and this allows the cable drum 19 to be raised up higher into the wing cavity so that it will not protrude below the lower surface of the wing. Referring to the outboard slat panel 14 shown in the plan of FIG. 1, because an airplane wing generally tapers in planform and thickness toward the tip, the airfoil cross-sectional area forward of the front wing spar 11, in generally known slat extension systems, is such that there is insufficient area for installing said known systems and still be capable of producing the amount of slat travel or extension distance of the present invention without extreme complexity.

The slat carrier track 20 has to fit within the cross-sectional contour area of the wing airfoil section and there has to be a certain amount of space left at the top of the wing cavity for structural support material. Also, in order to aerodynamically program the slat panel extension positions, a certain amount of space, both above and below the track 20, is necessary for properly locating and mounting the rollers 22 that support the carrier track 20. The operating positions of the slat panel 14, for producing satisfactory aerodynamic characteristics, substantially determine the location of the carrier track 20 and rollers 22; and in most cases, the carrier track 20 will be positioned closer to the upper surface of the wing because of the curvature of the carrier track 20 which follows the upper surface curvature more closely. Therefore, as a result, the largest space that remains in the airfoil envelope for locating an actuating mechanism is the distance between the carrier track 20 and the lower surface of the wing 10. Even though this is the largest remaining area for placement of actuating mechanism, it is still critical in depth size because the airfoil cross-sectional contour, at the location of the outboard slat panel 14, is quite slender in comparison to an inboard slat panel location where it gets quite thick. Therefore, the closeness between the center line of the carrier track 20 and axis of the cable drum 19, as shown in the present invention, provides a minimum depth for fitting the combination within the wing cross-sectional area.

Referring to FIGS. 2 and 3, it can be seen that, if the periphery of the cable drum 19 was clear of or below the undersurface of the slat carrier track 20, the axis of the cable drum 19 would have to be lowered and the lower portion of the cable drum 19 would protrude from the lower surface of the wing.

FIG. 5 shows a cable tension adjusting nut 25 and a stack of spring washers 26 which are used for tension compensation due to temperature variation and cable stretch. The cable drum 19 is mounted slightly off center on the actuator output shaft collar 17 in order to compensate for the small change in cable length that occurs during extension and retraction due to the changing geometry. The cable length is greater when the cable drum 19 is in the center of the cable span than it is at the ends of the span. A steel ball 27 is swaged on the cable 18 and is retained in a slot in the rim of the cable drum 19 to provide a positive connection between the cable and drum.

FIG. 6 is an end view of the track 20, taken along the line 7—7 of FIG. 5, to show the aft cable terminal fitting 18 connection to the track 20 by the threaded fastener 28.

FIG. 7 is a sectional view, taken along the line 7—7 of FIG. 5, through the forward connection of the cable 18 and the carrier track 20. This connection is made by a trunnion 29 which is supported by two bearings 30 mounted in the track 20. A forward cable terminal fitting 18B passes through a hole in the trunnion 29 and is secured by the adjusting nut 25.

With respect to the cross-sectional shape of the slat support track 23: as shown in the cross-sectional view of FIG. 4, there is an upper horizontally continuous material mass, a lower horizontally separated material mass, and a vertical pair of parallel walls of material mass, webs or stiffeners, in between the upper and lower horizontal material masses; and a definitive description of this cross section is "a slotted I-shape" whose web section and lower flange are split vertically to produce a slot or an inverted U-shaped channel in the lower surface for insertion of the cable drum drive means. Another definitive title of this cross section is "a hat section".

In order for the carrier track 20 to function properly as the main support member for an extendible high-lift device such as the slat panel 14, most of the material mass has to be concentrated in the highly stressed upper and lower outer fibers of the carrier track cross section; and the cross-sectional shape of the carrier track 20 will have a relatively high moment-of-inertia, preferably approaching that of an I-beam, in order to provide the maximum beam bending strength for a given height and mass of material.

A carrier track having an inverted U-shaped cross section could also be broadly described as having upper and lower outer fibers, with a vertical pair of webs in between; however, strictly speaking, there is very little material mass concentrated in the lower cross-sectional area of the vertical pair of webs. Therefore, the term "inverted U-shaped" is not believed to be sufficiently definitive of a structurally acceptable cross-sectional shape that would have a moment-of-inertia approaching that of an I-beam; and without a certain amount of cross-sectional material mass concentrated in the lower portion of an inverted U-shaped track, it will not be strong enough to support the high-lift device with its imposed aerodynamic load when it is at its fully extended position relative to the airfoil. Therefore, strictly speaking, an inverted U-shaped cross sectional carrier track is not functionally satisfactory as the main support member for said high-lift device.

From the standpoint of bending strength vs. weight, an I-beam is ideal i.e., the sectional properties, such as moment-of-inertia and cross-sectional distribution of material mass (where there is an equal amount of mass top and bottom and where the major portion of the cross-sectional means is also concentrated in said top and bottom outer fibers), make it a good support beam.

The cable fasteners, such as bolt and nut 28 which secure the cable drive means within the inverted U-shaped channel or slot of track 20, are located at or near the low stressed neutral axis of the slotted I-shaped or hat-shaped cross section of the track. If the fasteners 28 were located at a different location, such as passing through the highly stressed flanges of the track, the bending strength characteristics of the track would be seriously compromised.

The flanges of the slotted I-shaped or hat-shaped cross section of the track provide the necessary contact area for the rollers 22 in order to satisfy bearing stress level requirements. An inverted U-shaped cross section may meet the bearing stress level requirement, but only at the expense of very thick walls and consequent weight penalty.

Referring to FIGS. 4 and 8, the cable drum drive means, carrier track 20 and rollers 22 are centered spanwise between a pair of wing ribs 12 which provide a structurally straddled support. The axially aligned series of high speed shafts 15 rotate within the approximate range of 600 to 1,000 r.p.m. and go into and through rotary actuators 16 which comprise a planetary gear mechanism of about a 200:1 reduction ratio; and which planetary gear mechanism rotates the cable drum 19 at a relatively slot rate of speed. The cable drum drive means is positioned within the inverted U-shaped channel or slot of the carrier track 20 and located on the cross-sectional, vertical centerline of the carrier track 20 in order to produce a symmetrical drive force for extension and retraction of the slat panel 14. An asymmetrical drive force e.g., such as that produced by a cable drum drive means mounted on only one side of a track member, would produce unacceptable side loads, friction and driving forces. Further, if a pair of cable drum drive means were straddle mounted, one on each side of a track member, such that a drive force was produced on both sides of the central track member, then synchronization of the drive force would present a problem in addition to an increase in weight and cost. Also, as shown in the cross-sectional view of FIG. 4, the track support rollers 22 are supported by through shafts or bolts, i.e., bolts passing through a pair of support ribs 12, one on each side thereof, to provide for maximum load carrying capability. This straddle-mounted, dual support contrasts with a cantilevered roller configuration which provides a much less load carrying capability.

While the invention has been disclosed with reference to a preferred embodiment, it is to be understood that those modifications and changes which become obvious to a person skilled in the art to which this invention pertains, as a result of the teaching hereof, are considered to be encompassed by the following claims.

I claim:

1. A mechanism for extending and supporting a high-lift device relative to an airfoil, comprising: a carrier track connected to said high-lift device and extending chordwise of said airfoil; track support means secured to said airfoil and being in bearing contact with said carrier track for guiding support thereof; said carrier track being of a slotted I-beam shaped cross section having approximately an I-beam mass distribution and whose web section and lower flange are vertically split and laterally spaced part forming an inverted U-shaped slot opening along the lower length thereof; a cable mounted within said carrier track slot and fastened at either end thereof, at the approximate neutral bending axis of said carrier track; a cable drum adapted to winding engagement with said cable fastened between the interior ends of said carrier track slot for extending the high-lift device relative to said airfoil; and thereby, increasing the aerodynamic lift characteristics thereof.

2. A mechanism for extending and supporting a high-lift device relative to an airfoil, comprising: a pair of wing ribs spaced apart spanwise and extending chordwise of said airfoil; a set of cylindrical rollers being straddle mounted between said pair of wing ribs; a carrier track connected to said high-lift device and extending chordwise of said airfoil between said pair of wing ribs; said rollers being positioned above and below said carrier track with their rotational axis aligned transversely with respect to said chordwise extending carrier track for rolling support contact thereof; said carrier track being of a slotted I-beam shaped cross section having approximately an I-beam mass distribution and whose web section and lower flange are vertically split and laterally spaced apart forming an inverted U-shaped slot opening along the lower length thereof; a cable mounted within said carrier track slot and fastened at either end thereof, at the approximate neutral bending axis of said carrier track, such that said cable and its end fasteners are substantially isolated from bending stress imposed on said carrier track; a cable drum adapted to winding engagement with said cable fastened between the interior ends of said carrier track slot for extending the high-lift device relative to said airfoil; and thereby, increasing the aerodynamic lift characteristics thereof.

3. A mechanism for extending and supporting an auxiliary airfoil relative to a main airfoil for increasing the overall airfoil area comprising: a carrier track extending afore and aft in said main airfoil and being pivotally connected at one end to said auxiliary airfoil; track support means secured to said main airfoil for guiding support of the other end of said carrier track; said carrier track being of a hat-shaped cross section whose vertically parallel, dual web sections and lower flanges are laterally spaced apart forming an inverted U-shaped channel opening along the lower length thereof, and said hat-shaped cross section having approximately an I-beam mass distribution; a cable mounted within said carrier track channel and fastened on the dual web sections of said carrier track hat-shaped cross section at either end thereof, at the approximate neutral bending axis thereof; a cable drum positioned within the channel opening between the dual web sections of said carrier track, and adapted to winding engagement with said cable for moving said carrier track fore and aft to effect relative movement between said auxiliary airfoil and said main airfoil; and said carrier track channel having its dual web sections extending downwardly to straddle said interior positioned cable drum such that the inner facing web sections form a raceway for maintaining the cable and drum in said raceway.

* * * * *